United States Patent
Laleh et al.

(10) Patent No.: US 11,749,931 B2
(45) Date of Patent: Sep. 5, 2023

(54) ELECTRICAL CONNECTION UNIT FOR HIGH-VOLTAGE BATTERY PACKS

(71) Applicant: GM GLOBAL TECHNOLOGY OPERATIONS LLC, Detroit, MI (US)

(72) Inventors: Nusha Laleh, Farmers Branch, TX (US); Zachary S. Mendla, Shelby Township, MI (US); Adam J. Tallman, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 17/557,516

(22) Filed: Dec. 21, 2021

(65) Prior Publication Data

US 2023/0198188 A1    Jun. 22, 2023

(51) Int. Cl.
| H01R 13/44 | (2006.01) |
| H01M 50/505 | (2021.01) |
| H01R 13/207 | (2006.01) |
| H01R 13/621 | (2006.01) |

(52) U.S. Cl.
CPC .......... *H01R 13/44* (2013.01); *H01M 50/505* (2021.01); *H01R 13/207* (2013.01); *H01R 13/6215* (2013.01)

(58) Field of Classification Search
CPC .. H01R 13/44; H01R 13/207; H01R 13/6215; H01M 50/505
See application file for complete search history.

(56) References Cited

U.S. PATENT DOCUMENTS

| 9,620,763 | B1* | 4/2017 | Zeng | H01M 50/522 |
| 10,971,714 | B2 | 4/2021 | Tallman et al. | |
| 2011/0244310 | A1* | 10/2011 | Kim | H01M 10/0413 |
| | | | | 429/178 |
| 2015/0140408 | A1* | 5/2015 | Hayashida | H01M 50/24 |
| | | | | 429/159 |
| 2019/0379015 | A1* | 12/2019 | Ochi | H01M 50/505 |
| 2020/0295336 | A1* | 9/2020 | Tallman | H01M 50/543 |
| 2020/0403329 | A1* | 12/2020 | Durse | H01R 11/288 |
| 2021/0408607 | A1* | 12/2021 | Saito | H01M 10/0525 |

FOREIGN PATENT DOCUMENTS

CN    3664225    * 6/2020    ............. H01R 13/61

* cited by examiner

*Primary Examiner* — Truc T Nguyen
(74) *Attorney, Agent, or Firm* — Quinn IP Law (57) ABSTRACT

An electrical connection unit for a battery pack includes a busbar having a first hole therein, a top surface and a bottom surface, an annular bushing having a top end abutting the bottom surface, a bottom end opposed to the top end and a bore hole therein registered with the first hole, a busbar cage secured to the busbar and retaining the annular bushing in abutment with the busbar, the busbar cage having a cavity therein above the top surface, and a fastener having a head portion captured within the cavity and a shank portion extending through the first hole. The annular bushing may include one or more indents formed on an outer surface thereof, and the busbar cage may include a plurality of fingers extending along the outer surface and interfacing with the one or more indents. Each finger may include a protrusion configured to rest within an indent.

19 Claims, 6 Drawing Sheets

ELECTRICAL CONNECTION UNIT FOR HIGH-VOLTAGE BATTERY PACKS

INTRODUCTION

This disclosure relates generally to electrical connection units for high-voltage battery packs.

Batteries are often connected together to form battery packs. A concern that may arise with individual batteries having high voltage, or with a battery pack having high voltage, is the safety of human operators involved in the handling of such batteries. In particular, one concern is that a human operator may inadvertently touch one or more exposed battery terminals and receive an electrical shock.

This concern is often addressed by covering the terminals with plastic caps (e.g., during shipment and storage of the batteries) in order to prevent human operators from inadvertently touching the terminals. However, providing such terminal covers increases cost, parts count and recycling/landfill waste concerns.

SUMMARY

According to one embodiment, an electrical connection unit for a battery pack includes: a busbar having a top surface, a bottom surface and first and second ends with respective first and second holes therein; an annular bushing having a top end abutting the bottom surface, a bottom end opposed to the top end and a bore hole therein registered with the first hole; a busbar end cage secured to the busbar and retaining the annular bushing in abutment with the busbar, the busbar end cage having a cavity therein above the top surface; and a fastener having a head portion captured within the cavity and a shank portion extending through the first hole.

The annular bushing may include one or more indents formed on an outer surface thereof, and the busbar end cage may include a plurality of fingers extending along the outer surface and interfacing with the one or more indents. Each of the fingers may include a respective inwardly extending protrusion configured to rest within a respective one of the one or more indents, and the one or more indents may include a circumferential indent formed on the outer surface about an entire circumference thereof. The shank portion of the fastener may be externally threaded, and at least one of the first and second holes may be a slot. The busbar may include opposing side surfaces which adjoin the top and bottom surfaces, wherein the busbar end cage wraps about and encloses respective portions of the top, bottom and side surfaces.

The busbar, annular bushing, busbar end cage and fastener may be characterized as a busbar assembly, and the electrical connection unit may further include a terminal assembly having an electrically insulative body and an electrically conductive annular terminal. On a top exterior portion thereof, the body may include a generally annular floor region which is bounded by an outer wall about an outer perimeter of the floor region, and by an inner wall about an inner perimeter of the floor region, with a third hole formed through at least some of the thickness of the body within a projected footprint of the inner wall. In this arrangement, the annular terminal may be disposed atop the annular floor region, and the unit may be configured for being provided in an unassembled configuration, in which the busbar assembly and terminal assembly are not assembled together, and for being assembled into an assembled configuration, in which the busbar assembly and the terminal assembly are assembled together with the bottom end of the annular bushing in contact with a top face of the annular terminal and the shank portion of the fastener inserted into the third hole. The shank portion of the fastener may be externally threaded and the third hole may be internally threaded.

The inner and outer walls may have respective inner and outer heights above the top face of the annular terminal, and the annular terminal may have a radial span between the inner and outer walls, wherein the inner and outer heights and radial span are sized so as to preclude human fingertips above a predetermined size from touching the annular terminal in the unassembled configuration. In the assembled configuration, the annular bushing may be disposed between the inner and outer walls.

The busbar may have a longitudinal axis, the first hole may be a slot aligned along the longitudinal axis, and the busbar end cage may be slidably secured to the busbar and wraps about and encloses the first end of the busbar, with the unit further including a main busbar cage wrapping about and enclosing a main portion of the busbar between the first and second ends, thereby securing the main busbar cage to the busbar. In this arrangement, the busbar end cage and the main busbar cage may overlap each other and may be configured for movement of the busbar end cage, the annular bushing and the fastener along the longitudinal axis.

According to another embodiment, an electrical connection unit for a battery pack includes: a busbar having a first hole therein, a top surface and a bottom surface; an electrically conductive annular bushing having a top end abutting the bottom surface, a bottom end opposed to the top end and a bore hole therein registered with the first hole; an electrically insulative busbar end cage secured to the busbar and retaining the annular bushing in abutment with the busbar, the busbar end cage having a cavity therein above the top surface; and a fastener having a head portion captured within the cavity and a shank portion extending through the first hole; wherein the annular bushing includes one or more indents formed on an outer surface thereof, and the busbar end cage includes a plurality of fingers extending along the outer surface and interfacing with the one or more indents, wherein each of the fingers includes a respective inwardly extending protrusion configured to rest within a respective one of the one or more indents.

The one or more indents may include a circumferential indent formed on the outer surface about an entire circumference thereof, and the busbar may include opposing side surfaces which adjoin the top and bottom surfaces, wherein the busbar cage wraps about and encloses respective portions of the top, bottom and side surfaces. The busbar, annular bushing, busbar end cage and fastener may make up a busbar assembly, and the unit may further include a terminal assembly having an electrically insulative body and an electrically conductive annular terminal. In this configuration, the body may include (on a top exterior portion thereof) a generally annular floor region. The floor region may be bounded by an outer wall about an outer perimeter of the floor region, and by an inner wall about an inner perimeter of the floor region, with a third hole formed through at least some of the thickness of the body within a projected footprint of the inner wall. The annular terminal may be disposed atop the annular floor region, and the unit may be configured for being provided in an unassembled configuration, in which the busbar assembly and terminal assembly are not assembled together, and for being assembled into an assembled configuration, in which the busbar assembly and the terminal assembly are assembled together with the bottom end of the annular bushing in contact with a top face of the annular terminal and the shank portion of the fastener inserted into the third hole.

The inner and outer walls may have respective inner and outer heights above the top face of the annular terminal, and the annular terminal may have a radial span between the inner and outer walls, wherein the inner and outer heights and radial span are sized so as to preclude human fingertips above a predetermined size from touching the annular terminal in the unassembled configuration. And in the assembled configuration, the annular bushing may be disposed between the inner and outer walls.

According to yet another embodiment, a ganged electrical connection unit for a battery pack includes first and second generally U-shaped busbar/cage assemblies. Each busbar/cage assembly has a respective connecting leg with primary and secondary ends, and respective first and second extension legs extending outward from the primary and secondary ends, respectively. Each of the first and second busbar/cage assemblies includes: (i) a respective generally U-shaped busbar having respective upper, lower and lateral surfaces and respective first and second ends with respective first and second holes formed through the respective busbar proximate the respective first and second ends; (ii) a respective pair of annular bushings, wherein each bushing has a respective top end, a respective bottom end and a respective bore hole therein, wherein each bushing is registered with a respective one of the first and second holes with the respective top end abutting the respective lower surface of the respective busbar; (iii) a respective generally U-shaped busbar cage secured to the respective busbar and retaining the respective pair of annular bushings in abutment with the respective busbar, with the respective busbar cage having one or more respective cavities therein above the respective upper surface of the respective busbar and disposed proximate one or both of the respective first and second holes; and (iv) a respective pair of fasteners, wherein each fastener has a respective head portion captured within one of the one or more respective cavities and a respective shank portion extending through a respective one of the first and second holes.

In this embodiment, the connecting leg of the first busbar/cage assembly is slidably disposed atop and parallel with the connecting leg of the second busbar/cage assembly, such that the first and second extension legs of the first busbar/cage assembly extend away from the first and second extension legs of the second busbar/cage assembly. Also in this embodiment, the first and second busbar/cage assemblies are constrained for sliding with respect to each other along a direction perpendicular to the connecting legs.

The busbar cages of the first and second busbar/cage assemblies may include mechanical features and/or mechanisms incorporated therein and configured to constrain the first and second busbar/cage assemblies to slide with respect to each other in only the direction parallel to the connecting legs. Additionally, each of the annular bushings may include one or more respective indents formed on a respective outer surface thereof, and each respective busbar cage may include a plurality of respective fingers extending along the respective outer surface and interfacing with the one or more respective indents.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, an electrical connection unit (ECU) 20 for a battery pack 10, including a ganged, two-busbar, four-terminal ECU 300, are shown and described herein.

Figure 1:
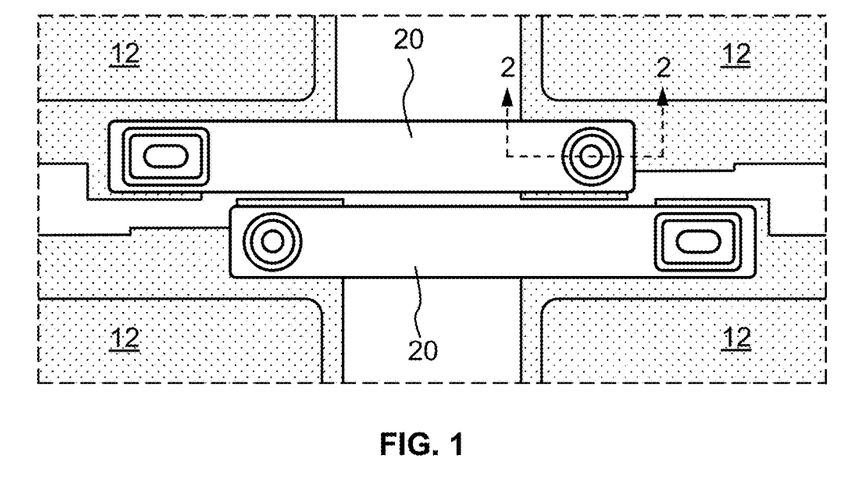
FIG. 1 is a schematic top view of batteries in a battery pack connected together by electrical connection units.
Figure 2:
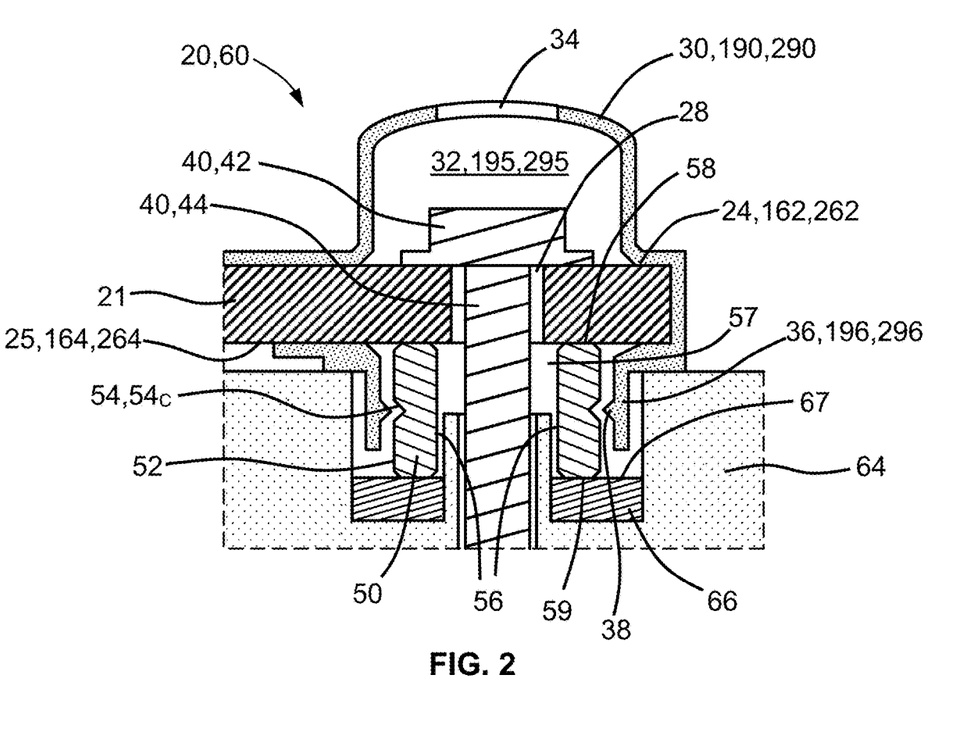
FIG. 2 is a schematic cross-sectional view of the electrical connection unit of FIG. 1 along lines 2-2.
Figure 3:
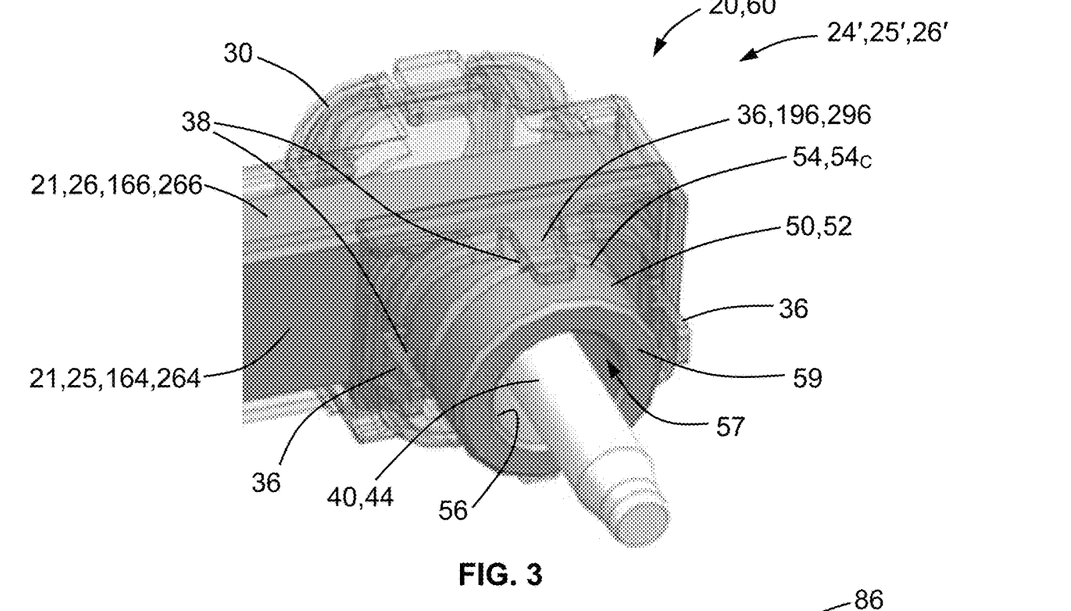
FIG. 3 is a schematic perspective view of the underside of the electrical connection unit of FIG. 2, in which the busbar cage is transparent.
Figure 4:
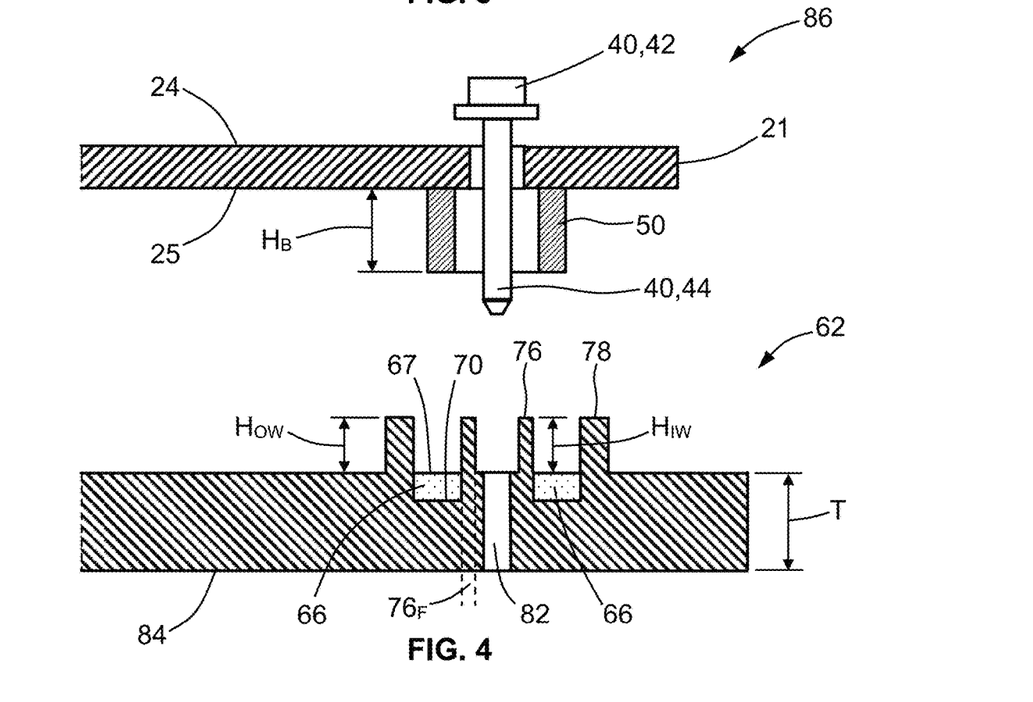
FIG. 4 is a schematic exploded cross-sectional view of the electrical connection unit of FIG. 2, but without the busbar end cage.
Figure 5A:
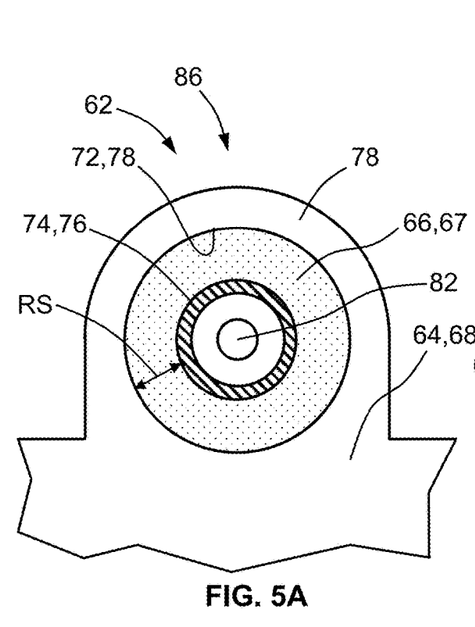
FIGS. 5A-B are schematic partial cross-sectional top views of a terminal assembly portion and annular bushing portion of the electrical connection unit of FIG. 4, in unassembled and assembled configurations, respectively.
Figure 5B:
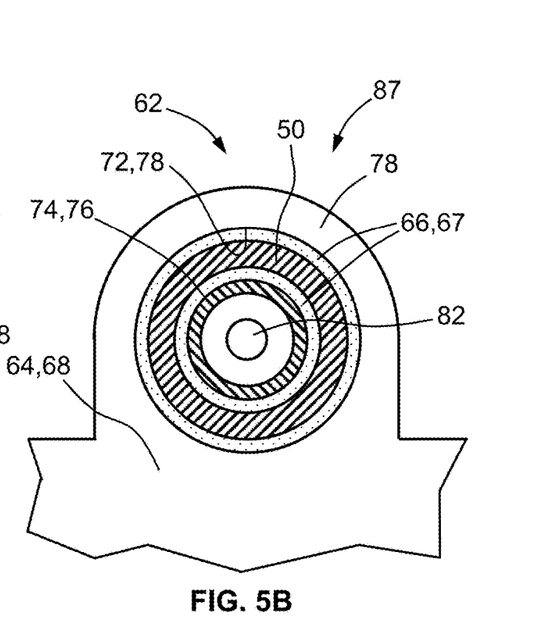
Figure 6:
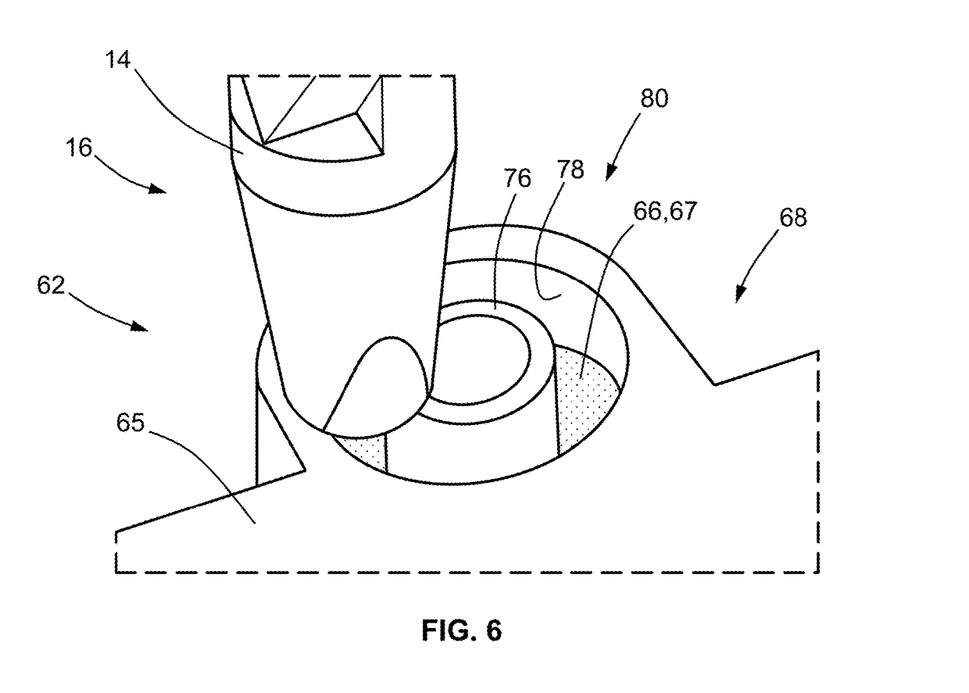
FIG. 6 is a schematic perspective view of the terminal assembly portion of FIG. 5A showing a fingertip probe.
Figure 7:
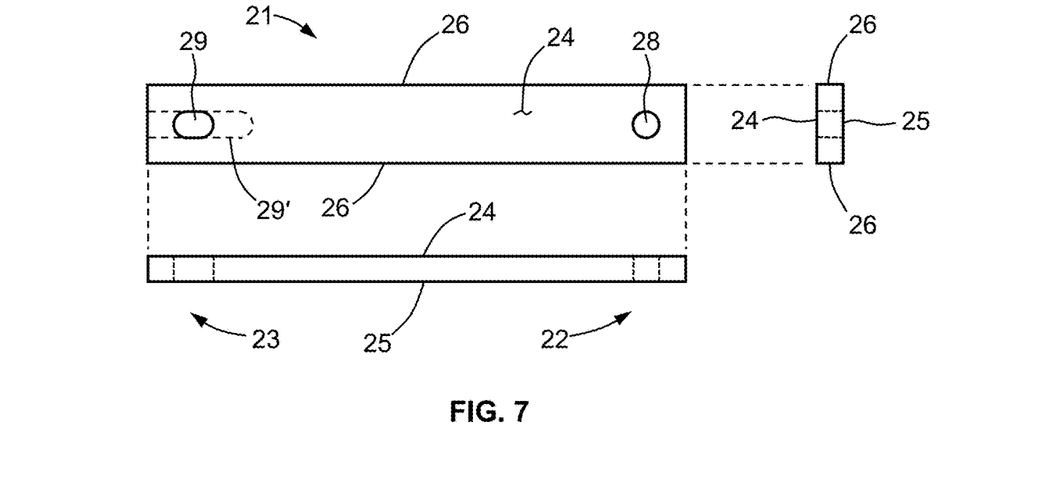
FIG. 7 shows schematic top, front elevation and side elevation views of a busbar used in an electrical connection unit.

FIG. 1 shows a schematic top view of four batteries 12 in a battery pack 10 connected together by two ECUs 20; i.e., a first set of two batteries 12 are connected together by one ECU 20, and a second set of two batteries 12 are connected together by another ECU 20. Relatedly, FIG. 2 shows a schematic cross-sectional view of one of the ECUs 20 of FIG. 1 along lines 2-2 (focusing on only one of the ends of the ECU 20), FIG. 3 shows a schematic perspective view of the underside of the ECU 20 in which the busbar cage 30 is transparent, and FIG. 4 shows a schematic exploded cross-sectional view of the ECU 20 (but without the busbar end cage 30, in order to highlight certain details). Additionally, FIGS. 5A-B show schematic partial cross-sectional top views of a terminal assembly 62 and annular bushing 50 portions of the ECU 20 of FIG. 4, in unassembled and assembled configurations 86, 87, respectively, FIG. 6 shows a schematic perspective view of the terminal assembly 62 of FIG. 5A showing a fingertip probe 14 probing an annular inset 80 formed on the terminal assembly 62, and FIG. 7 shows schematic views of a busbar 21 used in an ECU 20. Note that while some of the drawings only show one end of the ECU 20 and/or only one terminal assembly 62, and the descriptions below may focus on only that one end 22 and/or terminal assembly 62, it should be kept in mind that the ECU 20, 300 may have two or more ends having similar structure and function as the one shown and described. Also note that some of the drawings showing one end of the ECU 20 (e.g., FIGS. 2-4) also apply to the ends of the ganged ECU 300.

As described further below, the ECU 20 and ganged ECU 300 of the present disclosure are configured so as to make them "finger-proof"—i.e., to prevent someone from inadvertently touching the annular terminal 66 of a battery 12 or battery pack 10, even when the ECU 20, 300 is in an unassembled configuration 86.

According to one embodiment, the ECU 20 for a battery pack 10 has a main portion 88 and two opposed end portions 89, and includes a busbar 21, a busbar end cage 30, a fastener 40 and an annular bushing 50. The busbar 21 has opposed first and second ends 22, 23 with respective first and second holes 28, 29 therein, a longitudinal axis 27, a top surface 24, a bottom surface 25, and opposed side surfaces 26 which adjoin the top and bottom surfaces 24, 25. Each of the first and second holes 28, 29 may be a circular hole, an elongated mill slot, or any other suitable shape of hole. If either hole 28, 29 is formed as a slot, the outer perimeter of the slot may be spaced away from the edges of the busbar 21, as shown by hole/slot 29 in FIG. 7, or the outer perimeter of the slot may impinge upon the edge of the associated end 23 of the busbar 21, as shown by hole/end slot 29' drawn in dashed lines in FIG. 7. Note that while the busbar 21 is illustrated as a straight rectangular bar having 90-degree edges, it may also assume other shapes.

The annular bushing 50 is electrically conductive and may have a thick-walled tubular shape with an annular cross-section. The annular bushing 50 has a top end 58 abutting the bottom surface 25 of the busbar 21, a bottom end 59 opposed to the top end 58, a cylindrical outer surface 52, and a cylindrical inner surface 56 defining a bore hole 57 extending through the bushing 50 from the top end 58 to the bottom end 59. The annular bushing 50 is held in place against the bottom surface 25 by the busbar end cage 30 (as explained below) so as to be registered with the first hole 28 of the busbar 21. (That is, the longitudinal axes of the first hole 28 and the bore hole 57 are generally colinear with each other.) Note that while the annular bushing 50 is shown and described as being tubular with a circular annular cross-section, it may also assume other tubular shapes, such as having a square annular cross-section.

The busbar end cage 30 is made out of an electrically insulative material (e.g., plastic) and is configured so as to be secured to the busbar 21 and so as to retain the annular bushing 50 in abutment with the bottom surface 25 of the busbar 21. The busbar end cage 30 may wrap about and enclose selective portions 24', 25', 26' of the top, bottom and side surfaces 24, 25, 26 of the busbar 21, or it may enclose substantially all of these surfaces 24, 25, 26 (except for holes and gaps where needed). For example, the busbar end cage 30 may be injection molded as a single piece, or as multiple pieces, which is/are then assembled around the busbar 21 to enclose it. Alternatively, the busbar 21 may be placed into a mold and plastic material may be co-molded around the busbar 21. In either case, the busbar end cage 30 is formed so as to have a cavity 32 therein, positioned above the top surface 24 of the busbar 21 when assembled with the busbar 21.

The ECU 20 also includes a fastener 40 having a head portion 42 that is captured within the cavity 32 and a shank portion 44 which extends through the first hole 28 of the busbar 21. This fastener 40 may be inserted into the busbar end cage 30 through an aperture or window 34 that is formed in the top of the busbar end cage 30, with the aperture 34 (and/or the portion of the busbar end cage 30 that defines the aperture 34) being sized, shaped or otherwise configured so as to retain the head portion 42 of the fastener 40 within the cavity 32. The aperture 34 may also be configured so as to allow a tool (not shown) to be inserted therethrough to engage with the head portion 42, in order to permit turning of the fastener 40. For example, the tool may be an Allen key or hex wrench, and the head portion 42 may have a six-pointed hex socket on the top surface thereof. The shank portion 44 of the fastener 40 may be externally threaded, so as to engage with an internally threaded hole 82 and/or with a nut on the underside surface 84 of the terminal assembly body 64, as described below.

The annular bushing 50 may include one or more detents or indents 54 formed on an outer surface 52 of the bushing 50, and the busbar end cage 30 may include a plurality of fingers 36 extending downward along the outer surface 52 of the bushing 50 and interfacing with the one or more indents 54. Each of the fingers 36 may include a respective inwardly extending protrusion 38 configured to rest within a respective one of the one or more indents 54. Optionally, the one or more indents 54 may include a single circumferential indent $54_C$ formed on the outer surface 52 and running about the entire circumference of the outer surface/bushing 52, 50.

The busbar 21, annular bushing 50, busbar end cage 30 and fastener 40 may be collectively characterized as a busbar assembly 60 (e.g., see FIGS. 2-3), and the ECU 20 may further include a terminal assembly 62 as shown in FIGS. 4, 5A-B and 6. The terminal assembly 62 includes an electrically insulative body 64 and an electrically conductive annular terminal 66. On a top exterior portion 68 of the terminal assembly 62, the body 64 may include a generally annular floor region 70 which is bounded by an outer wall 78 about an outer perimeter 72 of the floor region 70, and by an inner wall 76 about an inner perimeter 74 of the floor region 70. A third hole 82 is formed through at least some of the thickness T of the body 64 within a projected footprint $76_F$ of the inner wall 76. For example, the third hole 82 may extend through the entirety of the thickness T of the body 64 as measured from the annular floor region 70 or a top surface of the body 64, to an underside surface 84 of the body 64—in which case the third hole 82 is a through hole—or the third hole 82 may extend through only a portion of this thickness T—in which case the third hole 82 is a blind hole. In the latter blind hole case, the third hole 82 may be internally threaded and the shank portion 44 of the fastener 40 may be correspondingly externally threaded for engagement with the threaded third hole 82. And in the former through hole case, various combinations of a threaded or unthreaded third hole 82 and a threaded or unthreaded shank portion 44 may be provided, with an optional nut, pin or other fastener used to secure a tip of the shank portion 44 which extends beyond the underside surface 84 of the terminal assembly body 64 when the ECU 20, 300 is in the assembled configuration 87.

The annular terminal 66 may be disposed atop the annular floor region 70—that is, between the inner and outer walls 76, 78 radially. The ECU 20 may be configured for being provided in an unassembled configuration 86, in which the busbar assembly 60 and terminal assembly 62 are separate pieces and not assembled together, and for being assembled into an assembled configuration 87, in which the busbar assembly 60 and terminal assembly 62 are assembled together with the bottom end 59 of the annular bushing 50 disposed in mechanical and electrical contact with a top face 67 of the annular terminal 66, and the shank portion 44 of the fastener 40 inserted into the third hole 82. For example, the shank portion 44 of the fastener 40 may be externally threaded and the third hole 82 may be an internally threaded blind hole or through hole, with the fastener 40 sufficiently engaged and tightened so as to clamp the bottom end 59 of the annular bushing 50 against the top face 67 of the annular terminal 66. Although not shown in the drawings, the underside of the annular terminal 66 may be mechanically and electrically connected to conductive paths within the body 64 of the terminal assembly 62.

As illustrated in FIGS. 4, 5A-B and 6, the inner and outer walls 76, 78 of the terminal assembly 62 may have respective inner and outer heights $H_{IW}$, $H_{OW}$ above the top face 67 of the annular terminal 66, and the floor region 70 and annular terminal 66 may have a radial span RS as measured radially between the inner and outer walls 76, 78. (Note in FIG. 4 the top surface 65 of the body 64 and the top face 67 of the annular terminal 66 are both at the same height or level above the underside surface 84 of the body 64, which is equivalent to the thickness T. However, this is an optional arrangement, and other arrangements may also be used.) The inner and outer heights $H_{IW}$, $H_{OW}$ and radial span RS may be sized, spaced or otherwise configured so as to preclude human fingertips or a fingertip probe 14 above a predetermined size 16 from touching the annular terminal 66, even in the unassembled configuration 86, thus rendering the device "finger-proof". In other words, the heights $H_{IW}$, $H_{OW}$ of the inner and outer walls 76, 78 and the radial span or spacing RS therebetween may be selected so as to prevent a worker's fingers 14 from accidentally touching and potentially receiving a shock from the annular terminal 66. This "finger-proofing" may be verified during production and assembly of the terminal assembly 62 and ECU 20 by using standardized fingertip probes 14 (i.e., finger-shaped testing devices) without having to test the finger-proofing with actual human fingers. In addition to the inner and outer walls 76, 78 and their heights $H_{IW}$, $H_{OW}$ and radial spacing RS providing the aforementioned finger-proofing, this arrangement may also be such that when the busbar assembly 60 and the terminal assembly 62 are brought together in the assembled configuration 87, the annular bushing 50 of the busbar assembly 60 may be disposed between the inner and outer walls 76, 78, with the bottom 59 of the annular bushing 50 in mechanical and electrical contact with the top face 67 of the annular terminal 66—thus providing electrical continuity from the busbar 21 to the annular terminal 66 via the annular bushing 50. Note that the entirety of the terminal assembly 62 may be incorporated into a battery 12; that is, each battery 12 may utilize the structure of the terminal assembly 62 for each of its two battery terminals. Also note that the terminal assembly 62 may be used not only with the busbar assembly 60 of the ECU 20, but may also be used with the ganged ECU 300 described below.

While the above description has focused on only one of the end portions 89 of the ECU 20 in order to describe the ECU's structure and function, it should be noted that the ECU 20 may have a main portion 88 with a longitudinal axis 91, and two opposing end portions 89 disposed along the main portion longitudinal axis 91.

Figure 8:
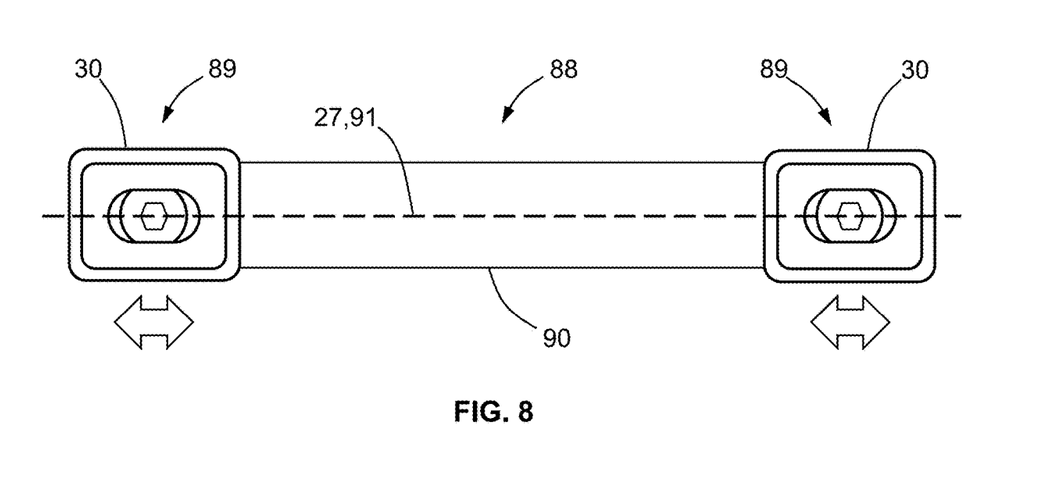
FIG. 8 is a schematic top view of an electrical connection unit having main and end portions that are longitudinally slidable with respect to each other.

FIG. 8 shows another embodiment, in which the ECU 20 includes a main portion 88 and one or two end portions 89 that are slidable with respect to the main portion 88 along the main portion longitudinal axis 91. (Note that the main portion longitudinal axis 91 and the busbar longitudinal axis 27 may be generally parallel with each other, and may also be generally colinear with each other.) This slidable aspect enables the distance between the two end portions 89 to be adjustable (e.g., to fit the spacing between two neighboring batteries 12). In this embodiment, the first hole 28 may be formed as a slot (29 or 29') aligned along the busbar longitudinal axis 27, and the busbar end cage 30 may be slidably secured to the busbar 21 and may wrap about and enclose the first end 22 of the busbar 21. The ECU 20 may further include a main busbar cage 90 wrapping about and enclosing a main portion 88 of the busbar 21 between the first and second ends 22, 23, thereby securing the main busbar cage 90 to the busbar 21. The busbar end cage 30 and the main busbar cage 90 may overlap each other and may be configured for movement of the busbar end cage 30, the annular bushing 50 and the fastener 40 as a unit along the busbar longitudinal axis 27. This longitudinally slidable configuration of the ECU 20 may include various mechanical features and/or mechanisms to facilitate the longitudinal sliding (similar to the mechanical features and/or mechanisms described below in connection with the ganged ECU 300).

Note that the ECU 20 in the foregoing embodiment may be provided in either of two different versions. In one version, only one end portion 89 is slidable with respect to the main portion 88; i.e., the one slidable end portion 89 would have its own busbar end cage 30 which is separate from (and slidable respect to) the main busbar cage 90, while the other end portion 89 would have its busbar end cage 30 integrated with the main busbar cage 90. And in the other version, both end portions 89 would be slidable with respect to the main portion 88; i.e., each end portion 89 would have its own busbar end cage 30 which is separate from the main busbar cage 90.

In practical use, the two end portions 89 may be moved toward or away from each other to match the spacing between the terminals of two neighboring batteries 12, such that the fastener 40 and annular bushing 50 at each end portion 89 is properly registered with its associated battery terminal. Note that when a slidable end portion 89 is slid with respect to the main portion 88 along the main portion longitudinal axis 91, the fastener 40 for that end portion 89 slides within the busbar slot (29 or 29') that is associated with that end portion 89. Then when the end portion 89 is in alignment with the desired battery terminal (e.g., terminal assembly 62), the fastener 40 may be fastened against the battery terminal/terminal assembly 62 such that the fastener 40, the busbar 21, the annular bushing 50 and the annular terminal 66 are mechanically connected and in electrical continuity with each other.

Figure 12A:
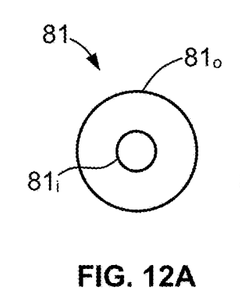
FIGS. 12A-H show various exemplary annular shapes.
Figure 12B:
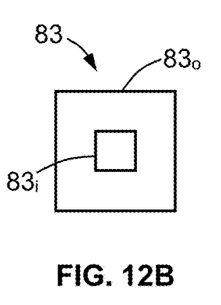
Figure 12C:
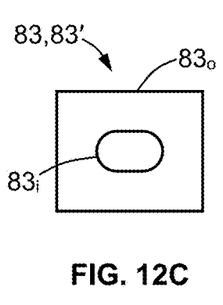
Figure 12D:
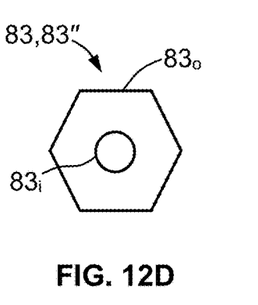
Figure 12E:
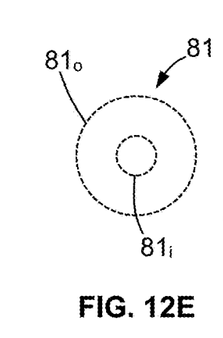
Figure 12F:
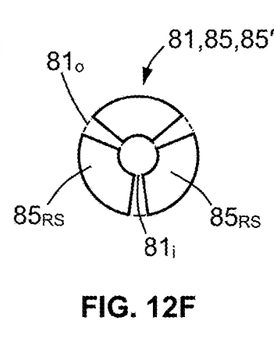
Figure 12G:
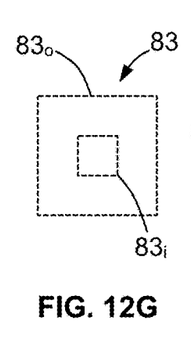
Figure 12H:
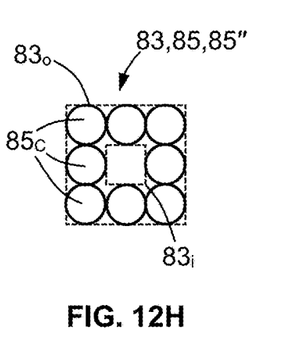

Note that while generally "annular" features such as the annular bushing 50, the annular terminal 66 and the annular floor region 70 are illustrated herein as having a traditional circular annulus shape 81, such as shown in FIG. 12A, where the inner and outer perimeters $81_i$, $81_o$ of the shape's cross-section are both circular and concentric with one another, it is also contemplated that "annular" includes other shapes where the inner and/or outer perimeters are shaped as ovals, squares, rectangles, hexagons or other shapes, such as the non-traditional annulus shapes 83 shown in FIGS. 12B-D. This also includes annular shapes 83 where the inner and outer perimeters $83_i$, 83o have different shapes from each other, such as the shape 83' shown in FIG. 12C where the outer perimeter $83_o$ is rectangular and the inner perimeter $83_i$ has the shape of a mill slot, and the shape 83" shown in FIG. 12D where the outer perimeter $83_o$ is hexagonal and the inner perimeter $83_i$ is circular. Further, "annular" also includes composite shapes 85 where an otherwise continuous annular shape is broken up into two or more segments forming a traditional circular annulus 81 (FIG. 12E) or a non-traditional, non-circular annulus 83 (FIG. 12G), such as the composite shape 85' shown in FIG. 12F where the overall circular annular shape 81 is made up of three non-contiguous radial sector segments $85_{RS}$, and the composite shape 85" shown in FIG. 12H where the overall non-circular annular shape 83 (i.e., a "square" annular shape) is made up of eight contiguous circular segments $85_C$. Thus, as used herein, "annular" may describe a shape or arrangement that generally forms a closed loop, path or swath about a central point or region, and which is bounded by an inner perimeter and an outer perimeter.

According to another embodiment, an ECU 20 for a battery pack 10 includes: a busbar 21 having a first hole 28 therein, a top surface 24 and a bottom surface 25; an electrically conductive annular bushing 50 having a top end 58 abutting the bottom surface 25 of the busbar 21, a bottom end 59 opposed to the top end 58 and a bore hole 57 therein registered with the first hole 28; an electrically insulative busbar end cage 30 secured to the busbar 21 and retaining the annular bushing 50 in abutment with the bottom surface 25 of the busbar 21, the busbar end cage 30 having a cavity 32 therein located above the top surface 24 of the busbar 21; and a fastener 40 having a head portion 42 captured within the cavity 32 and a shank portion 44 extending through the first hole 28. In this embodiment, the annular bushing 50 includes one or more indents 54 formed on an outer surface 52 of the bushing 50, and the busbar end cage 30 includes a plurality of fingers 36 extending along the outer surface 52 of the bushing 50 and interfacing with the one or more indents 54, with each of the fingers 36 including a respective inwardly extending protrusion 38 configured to interface with and rest within a respective one of the one or more indents 54.

The one or more indents 54 may include a circumferential indent $54_C$ formed on the outer surface 52 of the bushing 50 around the entire circumference of the outer surface 52. The busbar 21 may include opposing side surfaces 26 which adjoin the top and bottom surfaces 24, 25, with the busbar end cage 30 wrapping about and enclosing respective portions 24', 25', 26' of the top, bottom and side surfaces 24, 25, 26. The busbar 21, annular bushing 50, busbar end cage 30 and fastener 40 may make up or be characterized as a busbar assembly 60, and the ECU 20 may further include a terminal assembly 62 having an electrically insulative body 64 and an electrically conductive annular terminal 66. In this configuration, the body 64 may include (on a top exterior portion 68 thereof) a generally annular floor region 70. The floor region 70 may be bounded by an outer wall 78 about an outer perimeter 72 of the floor region 70, and by an inner wall 76 about an inner perimeter 74 of the floor region 70, with a third hole 82 formed through at least some of the thickness of the body 64 within a projected footprint $76_F$ of the inner wall 76. The annular terminal 66 may be disposed atop the annular floor region 70, and the ECU 20 may be configured for being provided in an unassembled configuration 86, in which the busbar assembly 60 and terminal assembly 62 are not assembled together, and for being assembled into an assembled configuration 87, in which the busbar assembly 60 and the terminal assembly 62 are assembled together with the bottom end 59 of the annular bushing 50 in electrically conductive contact with a top face 67 of the annular terminal 66 and the shank portion 44 of the fastener 40 inserted into the third hole 82.

The inner and outer walls 76, 78 may have respective inner and outer heights $H_{IW}$, $H_{OW}$ above the top face 67 of the annular terminal 66, and the annular terminal 66 may have a radial span RS between the inner and outer walls 76, 78, wherein the inner and outer heights $H_{IW}$, $H_{OW}$ and radial span RS are sized so as to preclude human fingertips 14 above a predetermined size 16 from touching the annular terminal 66 in the unassembled configuration 86. And in the assembled configuration 87, the annular bushing 50 may be disposed between the inner and outer walls 76, 78.

Figure 9:
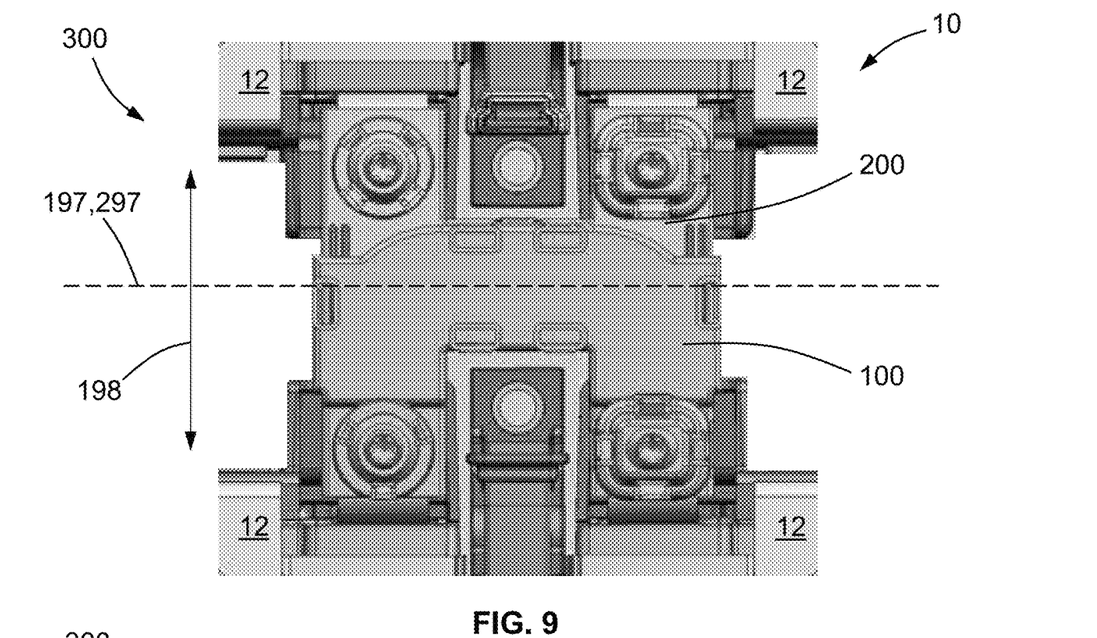
FIGS. 9-10 are schematic top and perspective views, respectively, of a ganged electrical connection unit.
Figure 10:
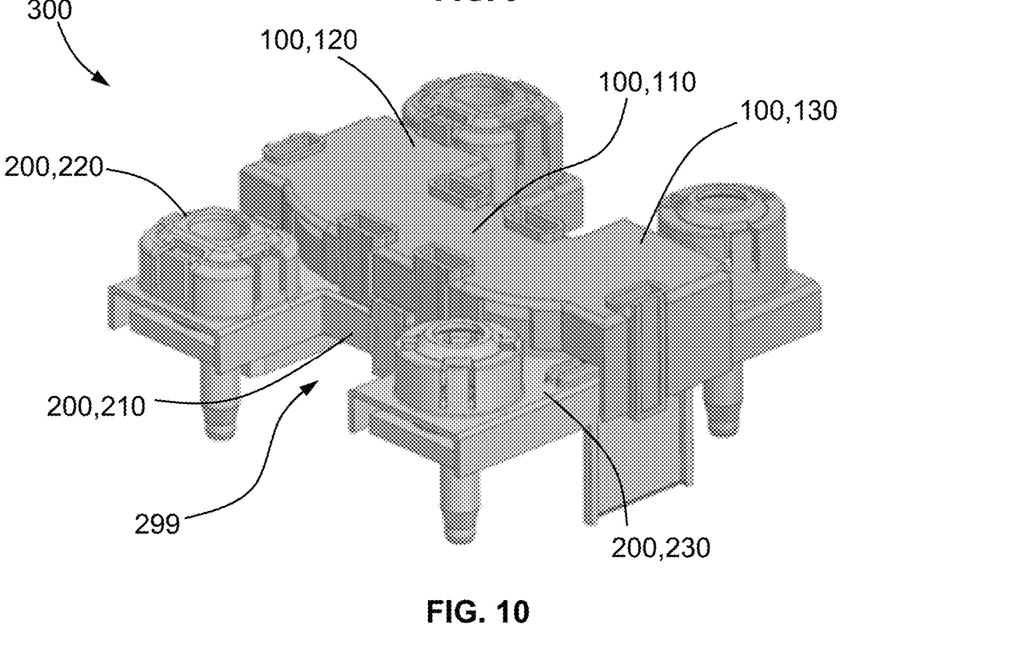

FIGS. 9-10 show yet another embodiment, in which a "ganged" ECU 300 for a battery pack 10 is provided. In this embodiment, two electrical connection units 20 are mechanically connected or ganged together while the two units 20 are not connected to each other electrically. (As used herein, a "ganged" ECU 300 means an electrical connection unit which includes two or more individual ECUs 20 that are arranged and connected together to work in coordination with each other.) This ECU 300 includes first and second busbar/cage assemblies 100, 200 that are each generally U-shaped. Each busbar/cage assembly 100, 200 has a respective connecting leg 110, 210 with a primary end 120, 220 and a secondary end 130, 230, a connecting leg longitudinal axis 197, 297, a first extension leg 140, 240 extending outward from the primary end 120, 220, and a secondary extension leg 150, 250 extending outward from the secondary end 130, 230.

Figure 11A:
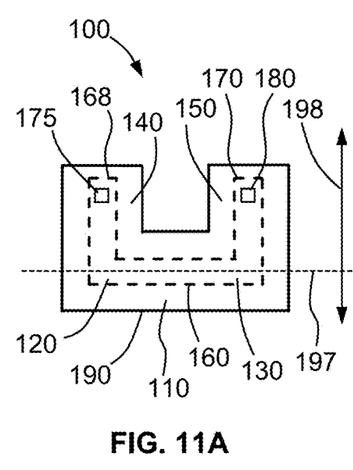
FIGS. 11A-C are schematic top views of possible U-shaped configurations for a busbar/cage assembly of a ganged electrical connection unit.
Figure 11B:
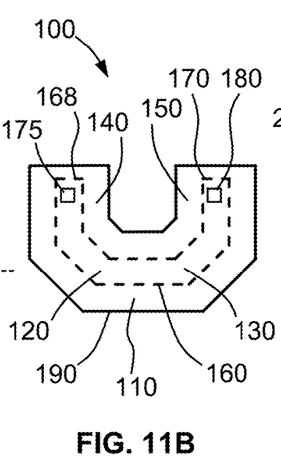
Figure 11C:
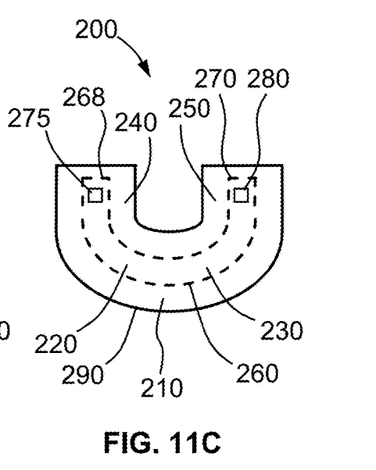

FIGS. 11A-C show schematic forms of possible U-shaped configurations for each busbar/cage assembly 100, 200, using the first assembly 100 as an example. As illustrated here, the extension legs 140, 150 may extend in a direction 198 that is generally perpendicular to the connecting leg longitudinal axis 197.

Each of the busbar/cage assemblies 100, 200 includes: (i) a respective generally U-shaped busbar 160, 260 having a respective upper surface 162, 262, lower surface 164, 264 and lateral surfaces 166, 266 and a respective first end 168, 268 and second end 170, 270 with a respective first hole 175, 275 and second hole 180, 280 formed through the respective busbar 160, 260 proximate the respective first end 168, 268 and second end 170, 270; (ii) a respective pair of annular bushings 50, wherein each bushing 50 has a respective top end 58, a respective bottom end 59 and a respective bore hole 57 therein, wherein each bushing 50 is registered with a respective one of the first and second holes 175, 275, 180, 280 with the respective top end 58 abutting the respective lower surface 164, 264 of the respective busbar 160, 260; (iii) a respective generally U-shaped busbar cage 190, 290 secured to the respective busbar 160, 260 and retaining the respective pair of annular bushings 50 in abutment with the respective busbar 160, 260, with the respective busbar cage 190, 290 having one or more respective cavities 195, 295 therein located above the respective upper surface 162, 262 of the respective busbar 160, 260 and disposed proximate one or both of the respective first and second holes 175, 275, 180, 280; and (iv) a respective pair of fasteners 40, wherein each fastener 40 has a respective head portion 42 captured within one of the one or more respective cavities 195, 295 and a respective shank portion 44 extending through a respective one of the first and second holes 175, 275, 180, 280.

In this ganged embodiment, the connecting leg 110 of the first busbar/cage assembly 100 is slidably disposed atop and parallel with the connecting leg 210 of the second busbar/cage assembly 200, such that the first and second extension legs 140, 150 of the first busbar/cage assembly 100 extend away from the first and second legs 240, 250 of the second busbar/cage assembly 200. For example, the extension legs 140, 150 of the first busbar/cage assembly 100 may point in the opposite direction as the extension legs 240, 250 of the second busbar/cage assembly 200. Also in this embodiment, the first and second busbar/cage assemblies 100, 200 are constrained for sliding with respect to each other along a direction 198 that is perpendicular to the connecting legs 110, 210.

The busbar cages of the first and second busbar/cage assemblies 100, 200 may incorporate various types of mechanical features and/or mechanisms 299 which are configured to constrain the two busbar/cage assemblies 100, 200 to slide with respect to each other in only the direction parallel to the connecting legs 110, 210. Note that as used herein, "mechanical features and/or mechanisms" include features that may be incorporated into or attached to the two busbar/cage assemblies 100, 200, such as slots, grooves, channels, guides, tabs, fingers, linkages, telescoping slides and the like, so as to facilitate the two busbar/cage assemblies 100, 200 in sliding with respect to each other along a desired constrained direction. Some of these features may be molded into the busbar cage 190, 290 of each assembly 100, 200, while others of these features may be attached to the busbar cages 190, 290 after they are molded. Additionally, each of the annular bushings 50 may include one or more respective indents 54 formed on a respective outer surface 52 of each bushing 50, and each respective busbar cage 190, 290 may include a plurality of respective fingers 196, 296 extending along the respective bushing outer surface 52 and interfacing with the one or more respective indents 54.

One advantage of the ECU 20 and ganged ECU 300 is that the dimensions of the annular bushing 50 and the inner and outer walls 76, 78 (including their respective heights $H_B$, $H_{IW}$, $H_{OW}$ and radial span RS) may be chosen so that not only does the annular bushing 50 fit within the inner and outer walls 76, 78 in contact with the annular terminal 66 in the assembled configuration 87, but additional radial spacing may be provided so as to accommodate manufacturing tolerances and stack-ups and any assembly misalignments. Thus, a certain amount of radial "slop" may be intentionally designed in, in order to compensate for these tolerances, stack-ups and misalignments.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An electrical connection unit for a battery pack, the unit comprising:
    a busbar having a top surface, a bottom surface and first and second ends with respective first and second holes therein;
    an annular bushing having a top end abutting the bottom surface, a bottom end opposed to the top end and a bore hole therein registered with the first hole;
    a busbar end cage secured to the busbar and retaining the annular bushing in abutment with the busbar, the busbar end cage having a cavity therein above the top surface; and
    a fastener having a head portion captured within the cavity and a shank portion extending through the first hole,.
    wherein the annular bushing includes one or more indents formed on an outer surface thereof, and the busbar end cage includes a plurality of fingers extending along the outer surface and interfacing with the one or more indents.

2. The unit of claim 1, wherein each of the fingers includes a respective inwardly extending protrusion configured to rest within a respective one of the one or more indents.

3. The unit of claim 1, wherein the one or more indents includes a circumferential indent formed on the outer surface about an entire circumference thereof.

4. The unit of claim 1, wherein at least one of the first and second holes is a slot.

5. The unit of claim 1, wherein the busbar includes opposing side surfaces which adjoin the top and bottom surfaces, and wherein the busbar end cage wraps about and encloses respective portions of the top, bottom and side surfaces.

6. The unit of claim 1, wherein the busbar, annular bushing, busbar end cage and fastener comprise a busbar assembly, and wherein the unit further comprises:
    a terminal assembly having an electrically insulative body and an electrically conductive annular terminal;
    wherein the body, on a top exterior portion thereof, includes a generally annular floor region bounded by an outer wall about an outer perimeter of the floor region and by an inner wall about an inner perimeter of the floor region, with a third hole formed through at least some of the thickness of the body within a projected footprint of the inner wall;
    wherein the annular terminal is disposed atop the annular floor region; and
    wherein the unit is configured for being provided in an unassembled configuration, in which the busbar assembly and terminal assembly are not assembled together, and for being assembled into an assembled configuration, in which the busbar assembly and the terminal assembly are assembled together with the bottom end of the annular bushing in contact with a top face of the annular terminal and the shank portion of the fastener inserted into the third hole.

7. The unit of claim 6, wherein the inner and outer walls have respective inner and outer heights above the top face of the annular terminal and the annular terminal has a radial span between the inner and outer walls, wherein the inner and outer heights and radial span are sized so as to preclude human fingertips above a predetermined size from touching the annular terminal in the unassembled configuration.

8. The unit of claim 6, wherein the shank portion of the fastener is externally threaded and the third hole is internally threaded.

9. The unit of claim 6, wherein, in the assembled configuration, the annular bushing is disposed between the inner and outer walls.

10. The unit of claim 1, wherein the busbar has a longitudinal axis, the first hole is a slot aligned along the longitudinal axis, and the busbar end cage is slidably secured to the busbar and wraps about and encloses the first end of the busbar, the unit further comprising:
 a main busbar cage wrapping about and enclosing a main portion of the busbar between the first and second ends, thereby securing the main busbar cage to the busbar;
 wherein the busbar end cage and the main busbar cage overlap each other and are configured for movement of the busbar end cage, the annular bushing and the fastener along the longitudinal axis.

11. An electrical connection unit for a battery pack, the unit comprising:
 a busbar having a first hole therein, a top surface and a bottom surface;
 an electrically conductive annular bushing having a top end abutting the bottom surface, a bottom end opposed to the top end and a bore hole therein registered with the first hole;
 an electrically insulative busbar end cage secured to the busbar and retaining the annular bushing in abutment with the busbar, the busbar end cage having a cavity therein above the top surface; and
 a fastener having a head portion captured within the cavity and a shank portion extending through the first hole;
 wherein the annular bushing includes one or more indents formed on an outer surface thereof, and the busbar end cage includes a plurality of fingers extending along the outer surface and interfacing with the one or more indents, wherein each of the fingers includes a respective inwardly extending protrusion configured to rest within a respective one of the one or more indents.

12. The unit of claim 11, wherein the one or more indents includes a circumferential indent formed on the outer surface about an entire circumference thereof.

13. The unit of claim 11, wherein the busbar includes opposing side surfaces which adjoin the top and bottom surfaces, and wherein the busbar end cage wraps about and encloses respective portions of the top, bottom and side surfaces.

14. The unit of claim 11, wherein the busbar, annular bushing, busbar end cage and fastener comprise a busbar assembly, and wherein the unit further comprises:
 a terminal assembly having an electrically insulative body and an electrically conductive annular terminal;
 wherein the body, on a top exterior portion thereof, includes a generally annular floor region bounded by an outer wall about an outer perimeter of the floor region and by an inner wall about an inner perimeter of the floor region, with a third hole formed through at least some of the thickness of the body within a projected footprint of the inner wall;
 wherein the annular terminal is disposed atop the annular floor region; and
 wherein the unit is configured for being provided in an unassembled configuration, in which the busbar assembly and terminal assembly are not assembled together, and for being assembled into an assembled configuration, in which the busbar assembly and the terminal assembly are assembled together with the bottom end of the annular bushing in contact with a top face of the annular terminal and the shank portion of the fastener inserted into the third hole.

15. The unit of claim 14, wherein the inner and outer walls have respective inner and outer heights above the top face of the annular terminal and the annular terminal has a radial span between the inner and outer walls, wherein the inner and outer heights and radial span are sized so as to preclude human fingertips above a predetermined size from touching the annular terminal in the unassembled configuration.

16. The unit of claim 14, wherein, in the assembled configuration, the annular bushing is disposed between the inner and outer walls.

17. A ganged electrical connection unit for a battery pack, the unit comprising:
 first and second generally U-shaped busbar/cage assemblies, each busbar/cage assembly having a respective connecting leg with primary and secondary ends and respective first and second extension legs extending outward from the primary and secondary ends, respectively, wherein each busbar/cage assembly includes:
 a respective generally U-shaped busbar having respective upper, lower and lateral surfaces and respective first and second ends with respective first and second holes formed through the respective busbar proximate the respective first and second ends;
 a respective pair of annular bushings, wherein each bushing has a respective top end, a respective bottom end and a respective bore hole therein, wherein each bushing is registered with a respective one of the first and second holes with the respective top end abutting the respective lower surface of the respective busbar;
 a respective generally U-shaped busbar cage secured to the respective busbar and retaining the respective pair of annular bushings in abutment with the respective busbar, with the respective busbar cage having one or more respective cavities therein above the respective upper surface of the respective busbar and disposed proximate one or both of the respective first and second holes; and
 a respective pair of fasteners, wherein each fastener has a respective head portion captured within one of the one or more respective cavities and a respective shank portion extending through a respective one of the first and second holes;
 wherein the connecting leg of the first busbar/cage assembly is slidably disposed atop and parallel with the connecting leg of the second busbar/cage assembly, such that the first and second extension legs of the first busbar/cage assembly extend away from the first and second extension legs of the second busbar/cage assembly, wherein the first and second busbar/cage assemblies are constrained for sliding with respect to each other along a direction perpendicular to the connecting legs.

18. The ganged electrical connection unit of claim 17, wherein the busbar cages of the first and second busbar/cage assemblies include mechanical features and/or mechanisms incorporated therein and configured to constrain the first and second busbar/cage assemblies to slide with respect to each other in only the direction parallel to the connecting legs.

19. The ganged electrical connection unit of claim 17, wherein each of the annular bushings includes one or more respective indents formed on a respective outer surface thereof, and each respective busbar cage includes a plurality of respective fingers extending along the respective outer surface and interfacing with the one or more respective indents.

\* \* \* \* \*